United States Patent Office 3,810,844
Patented May 14, 1974

3,810,844
PHOSPHORUS-TIN OXIDE OXIDATIVE
DEHYDROGENATION CATALYST
Emory W. Pitzer, Bartlesville, Okla., assignor to
Phillips Petroleum Company
No Drawing. Continuation of abandoned application Ser.
No. 39,544, May 21, 1970. This application June 9,
1972, Ser. No. 261,474
Int. Cl. B01j 11/82
U.S. Cl. 252—435                     9 Claims

ABSTRACT OF THE DISCLOSURE

The activity of a catalyst useful for the oxidative dehydrogenation of olefins comprising oxides of phosphorus and tin is improved by treating the catalyst with superheated steam to produce a catalyst having a surface area of which at least 2 m.$^2$/g. is comprised of pores having diameters of at least 700° A.

---

This is a continuation of application Ser. No. 39,544, filed May 21, 1970, now abandoned.

This invention pertains to catalyst compositions.

In one of its more specific aspects, this invention pertains to the mazimization of activity of phosphorus-tin oxide and lithium-phosphorus-tin oxide catalysts having porous structures.

Phosphorus-tin oxide and lithium-phosphorus-tin oxide catalysts are employable in the oxidative dehydrogenation of organic compounds, such as alkenes, alkadienes, cycloalkenes, alkylpyridines and alkyl aromatics to produce unsaturates such as 1,3-butadiene, isoprene, styrene and the like.

A method has now been discovered for increasing the catalytic activity of these catalysts. Simultaneously therewith, there has been discovered a novel catalyst composition for oxidatively dehydrogenating organic compounds.

According to the method of this invention, there is provided a process for increasing the activity of a phosphorus-tin oxide-containing oxidative dehydrogenation catalyst which comprises treating the catalyst to impart to the catalyst a surface area of which at least 2 m.$^2$/g. is in pores having a minimum diameter of 700 A.

Also, according to this invention there is provided a novel catalyst composition and a process for the oxidative dehydrogenation of organic compounds which employs that catalyst.

Accordingly, it is an object of this invention to provide an improved oxidative dehydrogenation catalyst.

It is another object of this invention to provide a process for treating a catalyst, the result of which is to provide a catalyst which produces increased yields of oxidatively dehydrogenated products.

This invention applies to those catalysts employed for oxidative dehydrogenation, those catalysts comprising phosphorus, tin, a metal of Group Ia or IIa, and oxygen. The presence of the Group Ia and IIa metal is preferred but optional. The catalyst contains from about 0.1 to about 16 weght percent phosphorus and from about 15 to about 75 weight percent tin. If the Group Ia or IIa metal is present, it is present in an amount up to about 5 weight percent and the metal is preferably lithium, the remainder being, substantially, combined oxygen.

The method of this invention pertains to that catalyst, and its use, as defined and disclosed in application Ser. No. 810,831 filed by George J. Nolan and Robert J. Hogan on Mar. 26, 1969, now abandoned.

In general, such catalysts are prepared by combining solutions of phosphorus and tin compounds under conditions suitable to produce a solid which is recovered and calcined.

For example, a catalyst can be prepared by adding 17.2 lbs. of $SnCl_4 \cdot 5H_2O$ in 4 gal. of deionized water, adding 3.7 lbs. of 85 percent $H_3PO_4$ to 2 gal. water, combining these solutions, adding $NH_4OH$ solution (7 liters of 58 percent $NH_4OH$ in 15 gal. water), until the pH is 3.5, aging the precipitate 6 or more hours, filtering, washing to remove essentially all of the chlorine, drying, forming into ⅛-inch tablets, and calcining at 1100° F. for 3 hours.

To produce the lithium-containing catalyst, the above-prepared phosphorus-tin oxide tablets can be impregnated with a sufficient quantity of an aqueous solution of lithium nitrate to give 1.5 weight percent lithium in the finished catalyst after calcination in air for 2 hours at 1100° F.

Catalysts of the phosphorus-tin oxide type are employed in oxidative dehydrogenation by contacting the dehydrogenatable organic feed with the catalyst, and with steam and a free oxygen-containing gas. Preferably, a mixture of the dehydrogenatable organic feed, steam and free oxygen-containing gas is contacted with the catalyst.

The contact is made at temperatures of from about 700° F. to above 1300° F., at pressures of from about 0.05 to about 250 p.s.i.a. and at a hydrocarbon GHSV of from about 50 to about 5000. The oxygen to gaseous organic feed volumetric ratio can be from about 0.1 to 1 to about 3 to 1, and the steam ratio can be from about 0.1 to about 50 volumes per volume of organic vapor.

The catalyst improvement method of the present is employed to adjust the catalyst to desired surface area, a portion of which is contributed by pores having diameters no less than a specified size. Adjustment of the catalyst can be made at any stage within the catalyst preparation procedure at which point the desired surface area effect can be produced without being substantially reduced by a subsequent step. For example, it can be practiced during drying, during calcining, while pelleting, or after the finished catalyst, in whatever form it is employed, is packed in a bed.

The method of the present invention produces a catalyst having a surface area in which at least 2 m.$^2$/g. is in pores having a minimum diameter of 700 A. It is preferable that the entire surface area of the catalyst be comprised of pores having substantially a diameter of 700 A; or, it is preferable that the entire surface of the catalyst be comprised of pores having a minimum diameter of 700 A. and a maximum diameter of 800 A. In practical situations, however, the range of pore sizes probably will be greater than that ideally desired.

The catalyst, when produced by the usual prior art methods of production, will not necessarily possess such surface area-pore size distribution. However, this surface area configuration can be attained by a number of methods, any of which is satisfactory. In general, a satisfactory method acts to collapse the intercellular walls between small pores to form larger pores of 700 A. or larger, and/or to form new pores of this size, and thus to provide the proper combination of surface area and pore diameter.

Any method which produces the desired surface area-pore size relationship can be employed. Steaming with superheated steam to maintain the catalyst between about 1000° F. and 1700° F., preferably between 1300° F. and 1600° F. for a time sufficient to produce the desired increase in surface area and activity, will suffice. Any convenient pressure can be used for the steam treatment.

Relatedly, the method of this invention can be carried out by heating moisture-carrying gases in contact with the catalyst to produce steam within the catalyst pores and to raise the catalyst to the temperatures specified.

The method of this invention will be illustrated using the steaming procedure without meaning to limit the invention thereto.

A phosphorus-tin oxide catalyst containing 10 percent phosphorus was prepared in the manner previously described in which the precipitate had been washed, dried and formed into ⅛-inch pellets which were calcined for 3 hours at 1100° F.

This catalyst, referred to hereinafter as Catalyst No. 1, was employed in its "as prepared condition" for the oxidative dehydrogenation of butene-2. Other samples of this same catalyst were steamed at various temperatures in accordance with the method of this invention to attain the desired surface area configuration. All of the samples were then employed for the oxidative dehydrogenation of butene-2.

In all the oxidative dehydrogenations, butene-2 was passed in a single-pass operation in contact with air, as the oxygen-containing gas, and with steam at atmospheric pressure and at temperatures indicated in Table I. Steam to butene ratios were maintained as constant as possible and ranged from 16.7 to 18.2. The butene-2 space velocity was 300 GHSV, the air:butene-2 ratio was 4:1, and the pressure was atmospheric. Results for the No. 1 Catalyst in the unsteamed condition and for each of the samples of the No. 1 Catalyst in the steamed condition were as shown in Table I.

TABLE I.—CATALYST NO. 1

| Sample | 1 | 2 | 3 | 4 | 5 |
|---|---|---|---|---|---|
| Steam treatment, ° F. for 16 hrs. | None | 1,250 | 1,350 | 1,450 | 1,550 |
| Surface area in pores larger than 700 A., m.²/g. | 4.2 | 1.5 | 2.6 | 3.8 | 5.2 |
| Total surface area, m.²/g. | 28 | 26 | 25 | 22 | 10 |
| Dehydrogenation results: | | | | | |
| After 15 min. at 900° F.: | | | | | |
| Yield | 46 | 40 | 48 | 59 | 63 |
| Reaction rate | 6.2 | 4.0 | 6.1 | 9.1 | 12.5 |
| Modivity, percent | 97 | 98 | 98 | 98 | 99 |
| After 15 min. at 1,000° F.: | | | | | |
| Yield | 52 | 47 | 54 | 70 | 76 |
| Reaction rate | 7.1 | 5.6 | 8.0 | 13.4 | 18.3 |
| Modivity, percent | 96 | 98 | 97 | 97 | 97 |

In the above table, "Yield" is defined as moles of butadiene produced per 100 moles of butene-2 in the feed per pass.

"Reaction Rate" is defined as moles of butadiene produced per liter of catalyst per hour, at a butadiene yield of 50 percent.

"Modivity" is selectivity based upon the gaseous products, namely, $C_1$ to $C_4$ hydrocarbons, carbon dioxide, and carbon monoxide.

Pore volume and surface area were measured by mercury intrusion at 15,000 p.s.i.g. with an Aminco digital readout porosimeter (American Instrument Company, inc.). Total surface areas were measured by nitrogen adsorption.

The above data illustrate the operability of the method of this invention. They also indicate that the initial effect of steam was to reduce that amount of surface area contributed by large pores (that is, pores having diameters larger than 700 A.) and also to reduce the reaction rate. However, with increasing steaming temperature, surface area in large pores was increased as was the yield and reaction rate. As the steaming temperature was increased further, a further increase in area in large pores as well as in yield and reaction rate was experienced at least up to a temperature of 1550° F.

A catalyst was prepared by coprecipitating sufficient $SnCl_4$ and $H_3PO_4$, which, after washing, drying, forming into ⅛-inch tablets and calcining three hours at 1100° F., contained 10 weight percent phosphorus. These tablets were impregnated with sufficient $LiNO_3$ solution to provide, after another calcination, 1.5 weight percent lithium based on the phosphorus-tin oxide composition.

Several samples of the above-prepared catalyst were subjected to several levels of steam treatment and then tested for oxidative dehydrogenation activity under the same dehydrogenation conditions described above. The steaming conditions and results of the dehydrogenation tests are shown in the following table:

TABLE II.—CATALYST NO. 2

| Sample | 1 | 2 | 3 | 4 |
|---|---|---|---|---|
| Steam treatment, ° F. for 15 hours | None | 1,280 | 1,350 | 1,550 |
| Dehydrogenation results: | | | | |
| After 3 hours at 900° F.: | | | | |
| Yield | 23.5 | 23.1 | 24.9 | 28.9 |
| Modivity, percent | 92.3 | 89.6 | 94.5 | 97.8 |
| After 3 hours at 1,000° F.: | | | | |
| Yield | 48.7 | 50.7 | 52.7 | 58.9 |
| Modivity, percent | 95.7 | 95.2 | 96.4 | 96.5 |

The above data illustrate the operability of the method of this invention in respect to the lithium-containing catalyst. Again, as in the case of Catalyst No. 1, with an increase in steaming temperature, both the yield and modivity increased appreciably over those values at the lower steaming temperature.

Inasmuch as the unsteamed catalyst can have surface areas in excess of 35, it is possible that the nitrogen surface area of the steam catalyst can be above 35 as an upper limit and, as the total surface area becomes represented in pores of 700 A., a lower surface area of about 6.

While no attempt is made to explain the invention, it would appear that other factors, not specifically related to surface area or pore diameter, are also affected by the steaming embodiment of this invention since, in the initial stages of steaming, there is an actual decrease in the surface area contributed by pores having a diameter of at least 700 A. but the catalyst yield and reaction rate are, nevertheless, actually increased when considered in relation to the amount of surface available in these pores. While the surface area-pore diameter relationship is a pertinent factor in the improvement of catalyst activity, some of these other factors, which are affected by the steaming method of this invention and which relate to the intrinsic activity, could be catalyst skin configuration, pore volume, skeletal density, tablet volume and cassiterite or crystalline tin oxide content. Seemingly, then, in the above tests, the intrinsic activity of the catalyst was affected by steaming at 1250° F. Further increases in steaming temperature may have had, up to the point of possibly excessive treatment, little additional effect on this intrinsic activity while making more surface area available in pores larger than 700 A. than were available in that catalyst steamed at 1250° F. The net result was an increase in catalytic activity up to a steaming temperature of about 1600° F.

It will be evident from the foregoing that various modifications can be made to the method of this invention. Such, however, are considered as being within the skill of the art.

What is claimed is:

1. A process for producing an oxidative dehydrogenation catalyst comprising contacting (a) a calcined composite consisting essentially of 0.1 to about 16 weight percent phosphorus, 15 to about 75 weight percent tin, 0 to about 5 weight percent lithium, and the remainder being substantially combined oxygen with (b) superheated steam sufficient to produce a catalyst having a surface area of which at least 2 m.²/g. is comprised of pores having diameters not less than 700 A.

2. A process according to claim 1 wherein the contacting is at a temperature between about 1300° F. and 1600° F.

3. A process according to claim 1 wherein said steam is generated within the pores of the catalyst.

4. A process according to claim 1 wherein the porosity of the catalyst is adjusted by steam treatment sufficient to produce a catalyst surface area comprised of an increased portion of pores having diameters between 700 A. and 800 A. as compared to the catalyst prior to said treatment.

5. A process according to claim 1 wherein a catalyst is adjusted to have a total surface area of from about 6 to about 35 m.$^2$/g. of which total from about 2 m.$^2$/g. to about 5.2 m.$^2$/g. is comprised of pores having a diameter not less than 700 A.

6. A process according to claim 5 in which said catalyst has a total surface area of about 10 m.$^2$/g. of which total about 5.2 m.$^2$/g. is comprised of pores having a diameter greater than 700 A.

7. The product of the process of claim 2.
8. The product of the process of claim 1.
9. The product of the process of claim 6.

References Cited

UNITED STATES PATENTS

| | | | |
|---|---|---|---|
| 3,274,283 | 9/1966 | Bethell | 252—437 X |
| 3,320,329 | 5/1967 | Nolan | 252—435 X |
| 3,501,547 | 3/1970 | Nolan et al. | 252—437 X |
| 3,501,548 | 3/1970 | Nolan et al. | 252—437 X |
| 3,513,215 | 5/1970 | Ogle | 260—680 E |
| 3,555,105 | 1/1971 | Nolan et al. | 252—437 X |

PATRICK P. GARVIN, Primary Examiner

U.S. Cl. X.R.

262—437; 260—668 D, 669 R, 680 E, 290 V